P. R. HAWTHORNE.
STEERING GEAR FOR MOTOR PROPELLED VEHICLES.
APPLICATION FILED MAR. 17, 1913.
1,101,542.
Patented June 30, 1914.
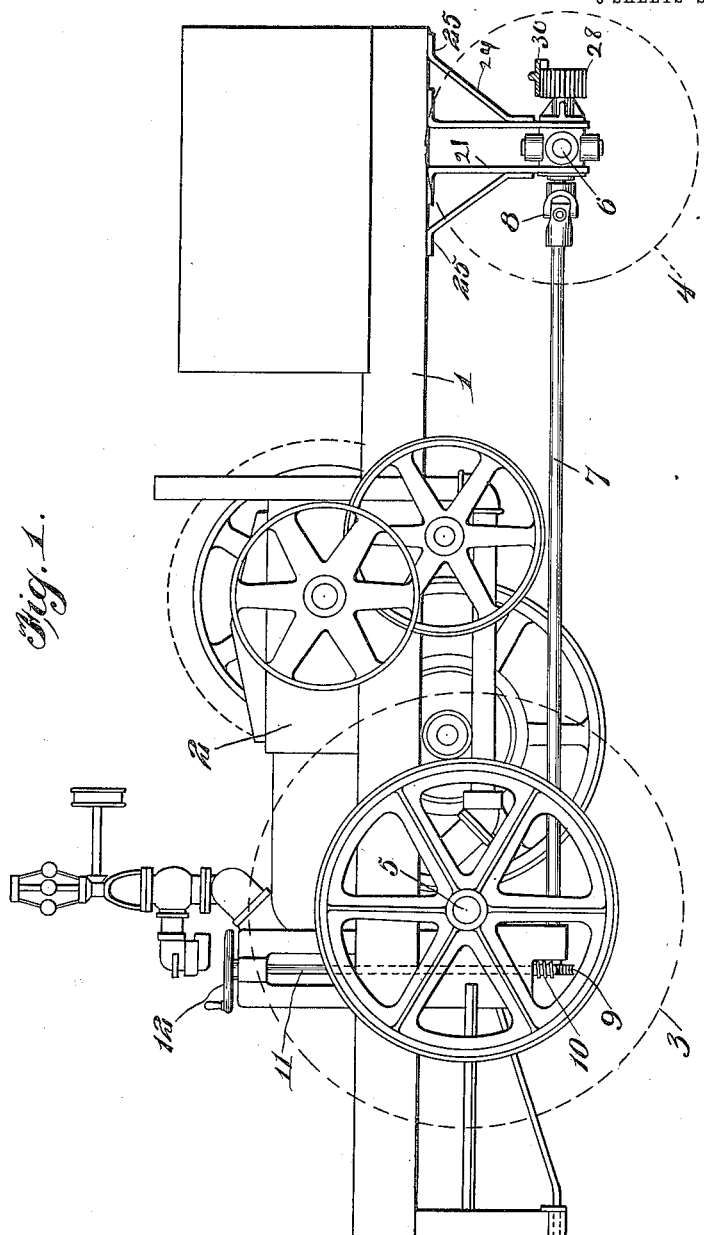
Witnesses
Louis R. Heinrichs
Fo. Ackman Jr.
Inventor
Primm R. Hawthorne
By Rexford M. Smith
Attorney

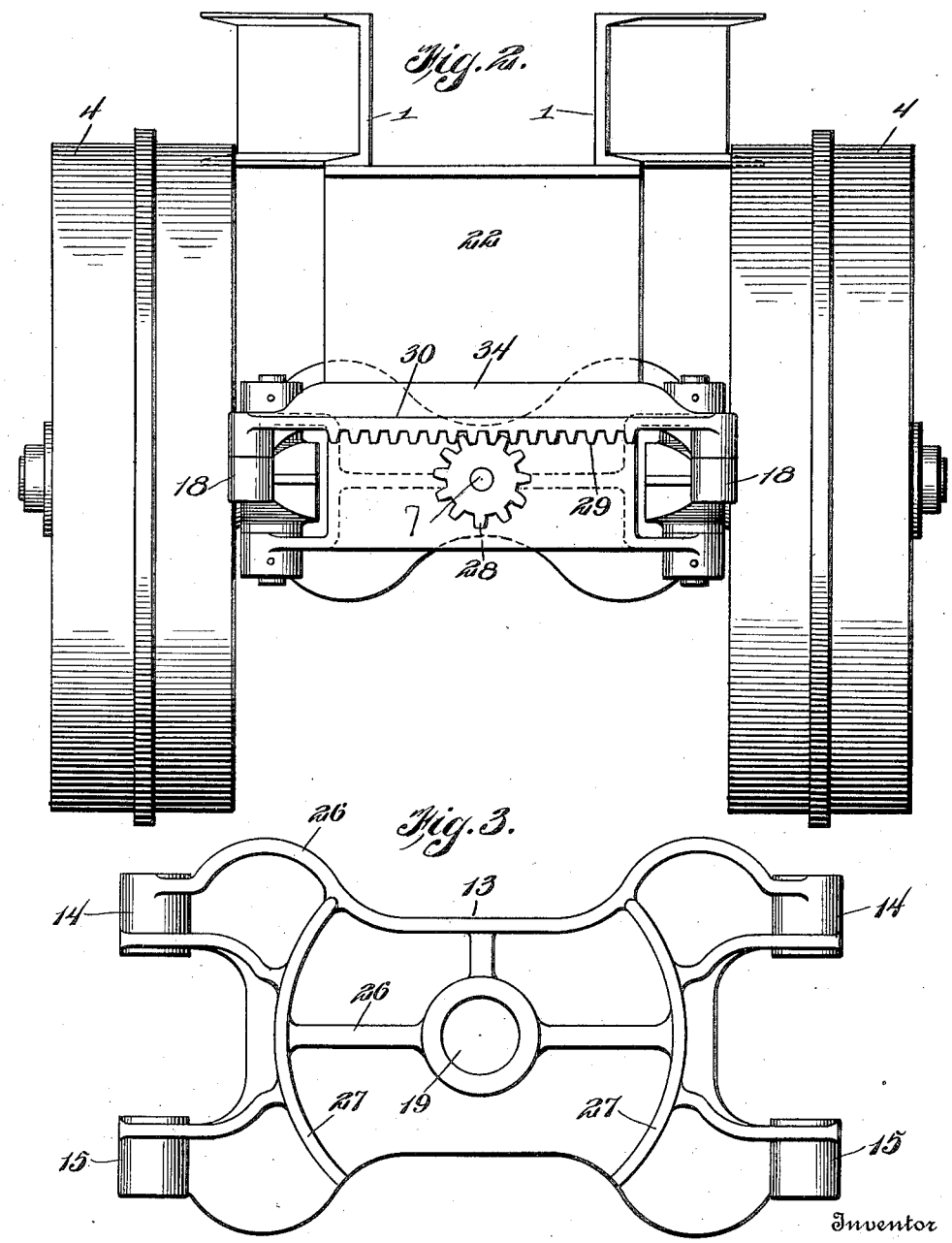

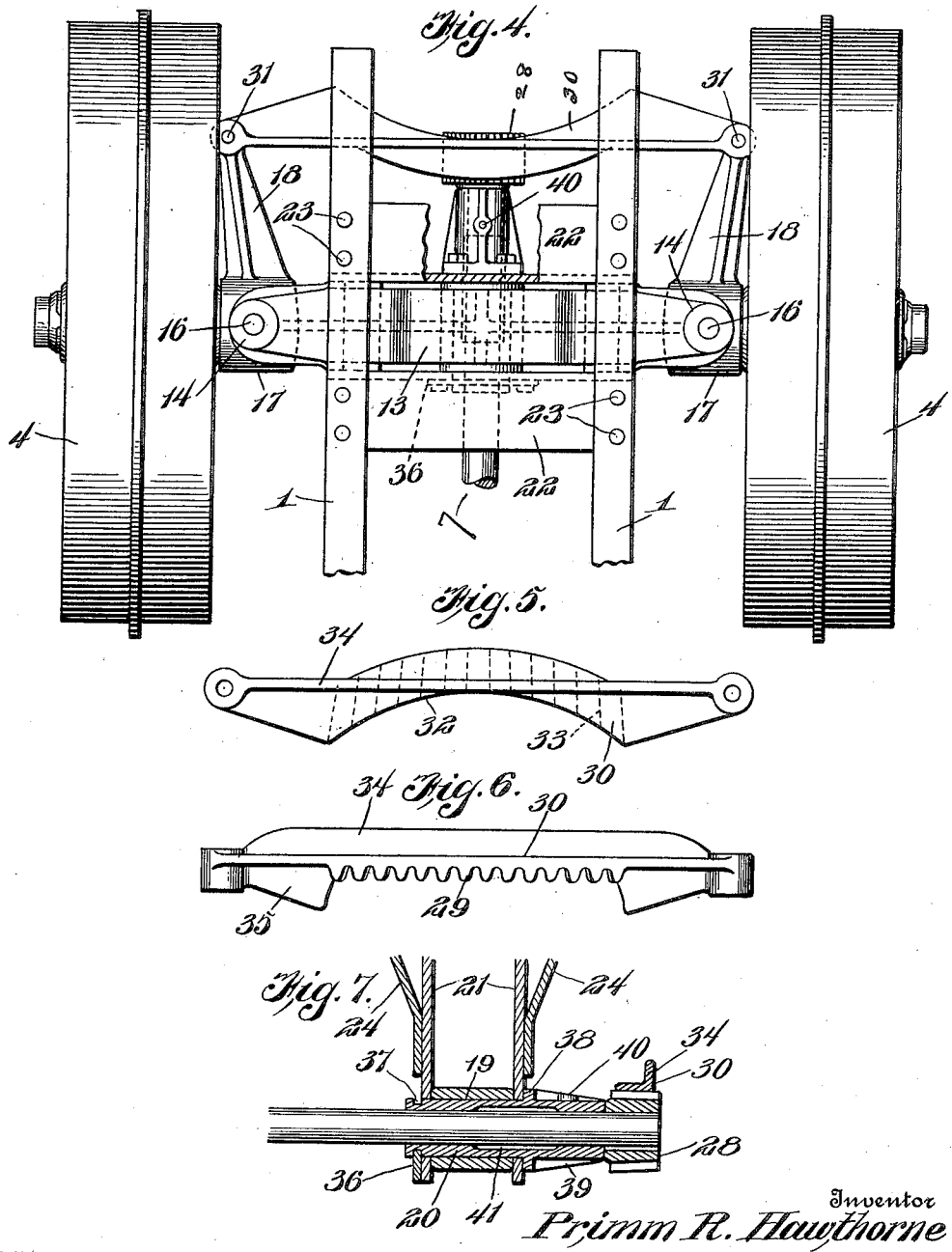

UNITED STATES PATENT OFFICE.

PRIMM R. HAWTHORNE, OF BATTLE CREEK, MICHIGAN, ASSIGNOR TO NICHOLS AND SHEPARD COMPANY, OF BATTLE CREEK, MICHIGAN.

STEERING-GEAR FOR MOTOR-PROPELLED VEHICLES.

1,101,542.  Specification of Letters Patent.  Patented June 30, 1914.

Application filed March 17, 1913. Serial No. 754,747.

*To all whom it may concern:*

Be it known that I, PRIMM R. HAWTHORNE, a citizen of the United States of America, residing at Battle Creek, in the county of Calhoun and State of Michigan, have invented a certain new and useful Steering-Gear for Motor-Propelled Vehicles, of which the following is a specification, reference being had therein to the accompanying drawing.

This invention relates to steering gear, the main object of the invention being to provide steering gear especially applicable to traction engines and motor driven vehicles of all descriptions, by means of which the parts necessary to produce the desired results are reduced to a minimum and are so related to each other as to permit the axle to which the steering wheels are connected to rock in a vertical plane transversely of the normal direction of travel of the machine, without interfering in any way with the operation of turning the steering wheels.

A further object of the invention is to provide steering gear of the character referred to, which will embody, in the highest degree, simplicity, economy of manufacture, and ease of manipulation.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of a traction engine showing the improved steering gear of this invention applied thereto. Fig. 2 is a front elevation thereof on an enlarged scale. Fig. 3 is a view in elevation of the front axle. Fig. 4 is a plan view, partly in section, showing the improved steering mechanism. Fig. 5 is a top plan view of the connecting rack bar. Fig. 6 is an edge view of the same. Fig. 7 is a detail vertical section through the axle, axle pivot, and bolster, showing the steering shaft in elevation.

In Fig. 1, I have illustrated a traction engine, only a sufficient portion of which will be described to enable those skilled in the art to understand the steering gear of this invention. In said Fig. 1, 1 designates the main frame of the machine having mounted thereon, adjacent to its front end, the motor 2, by which the machine is driven. 3 designates the driving wheels, and 4 the steering wheels, 5 designating the driving wheel axle, and 6 one of the knuckle journals, on which one of the steering wheels 4 is mounted in the usual manner. 7 designates the steering shaft provided at a suitable point in its length with a universal joint 8 which is preferably arranged close to the front axle, as shown in Fig. 1. At its rear end, the shaft 7 is provided with a worm gear wheel 9 which meshes with and is actuated by a worm 10 on the lower extremity of a substantially vertical shaft 11, on the upper end of which is a hand wheel 12, by means of which the machine is steered, said hand wheel being arranged within convenient reach of the driver in his seat on the machine.

The front axle 13, which is shown in detail in Fig. 3, has the opposite ends thereof forked to provide upper and lower bearings 14 and 15 for the journals 16 of the steering knuckles 17, the same as in ordinary automobile construction, each of said knuckles being provided with an arm 18, by means of which the knuckle is rocked in a horizontal plane by means hereinafter described. The axle 13 is provided with a central hole 19 to receive a tubular pivot 20 which is mounted in openings in a pair of bolster plates 21, said bolster plates being arranged in spaced relation to each other, as shown in Figs. 4 and 7, and being provided at their upper edges with flanges 22 bolted or riveted to the side bars 1 of the main frame, as shown at 23. The bolster composed of the parallel plates 21 is further reinforced by angle braces 24, the lower ends of which are secured to the plates 21 just above the tubular pivot 20, as shown in Fig. 7, the upper ends of said braces 24 being flanged, as shown at 25, and secured to the machine frame, as indicated in Fig. 1. The axle 13 is reinforced by flanges 26 to impart the requisite strength thereto, and is also provided with arcuate ribs 27 described in the arc of a circle, of which the tubular pivot 20 is the center, the ribs 27 bearing against the inner faces of the parallel bolster plates 21, so as to steady the axle, while permitting said axle to rock on the pivot 20, when one of the steering wheels passes over an obstruction.

The forward tumbling extension of the shaft 7 passes through the tubular pivot 20, as best shown in Fig. 7, and as clearly indicated in Figs. 2 and 4, and said shaft has fast on its forward extremity a spur pinion 28 which meshes with the teeth 29 of a rack bar 30, the opposite ends of which are pivotally connected, at 31, to the extremities of the knuckle arms 18, above referred to. For a portion of its length, the rack bar 30 is curved, as shown at 32, the curve being governed by the sweep of the arms 18, so that the teeth 29 will always be fully in mesh with the teeth of the pinion 28, irrespective of the degree to which the steering wheels 4 are turned. Furthermore, the teeth 29 are maintained in mesh with the teeth of the pinion 28 throughout their entire length, the pitch lines of the teeth 29 being indicated by dotted lines 33 in Fig. 5. The rack bar 30 may be provided at top and bottom with reinforcing ribs 34 and 35 to impart the necessary strength thereto for heavy duty. The tubular pivot 20 is locked in place by means of a key 36 which is in the form of a plate adapted to be fastened to one of the bolster plates 21, in the position shown in Fig. 7, said plate 36 being provided with a substantially semicircular recess in its inner edge which fits into a groove 37 in the pivot 20, thereby preventing said pivot from moving in the direction of its length through the openings in the bolster plates 21.

From the foregoing description, it will be observed that the axes of movement of the shaft 7 and axle 13 coincide with each other, the shaft 7 passing through the tubular pivot 20 and the axle being journaled to rock on said pivot. Therefore, the pinion 28 is maintained in perfect mesh with the rack bar 29, irrespective of the extent of rocking movement of the axle, so that the efficiency of the steering mechanism is not impaired or interfered with by reason of the rocking movement of the axle in a vertical plane. The tubular pivot 20 is provided in front of the forward bolster plate 21 with a stop flange 38 to prevent rearward movement of said pivot relatively to the bolster and other parts, and the forward projecting portion of the pivot is shown as reinforced by webs 39, one of which is bored transversely to provide an oil hole 40 to enable oil to be introduced into the bore of the pivot, which bore is enlarged or chambered, as shown at 41, so as to distribute the oil throughout the inner surface of the tubular pivot and along the shaft 7.

The parallel bolster plates act as guides, between which the axle 13 rocks in a vertical plane. Owing to the small number of parts employed to carry out the invention, friction is reduced to a minimum, and the entire mechanism operates with ease and smoothness, and without liability of getting out of order. Furthermore, the cost of manufacture of the machine as a whole is materially reduced, a great many parts, such as gear wheels, racks, segments, and other elements ordinarily employed in steering axles of the class referred to, being dispensed with.

What is claimed is:

1. In steering gear for motor propelled vehicles, a machine frame, a steering wheel axle centrally pivoted therein to rock in a vertical transverse plane, steering knuckles carried by the ends of said axle and mounted to turn on substantially vertical axes, steering arms on said knuckles, steering wheels journaled on said knuckles, a connecting bar extending transversely of the machine frame and pivotally connected to both steering arms to operate said arms, and provided with a rack segment, and having its toothed portion described on an arc governed by the sweep of the points of pivotal connection between the steering arms and said connecting bar, a steering shaft passing through the axis of rocking movement of said axle, and a pinion fast on said shaft meshing with said rack bar.

2. In steering gear for motor propelled vehicles, a machine frame, a steering wheel axle centrally pivoted therein to rock in a vertical transverse plane, steering knuckles carried by the ends of said axles and mounted to turn on substantially vertical axes, steering arms on said knuckles, steering wheels journaled on said knuckles, a tubular pivot passing through and removable from said axle and supported by the frame, a key on a fixed part of the machine frame shiftable into and out of locking engagement with said tubular pivot, a connecting bar extending transversely of the machine frame and pivotally connected to both steering arms to operate said arms, and provided with a rack segment, a steering shaft passing through and journaled in said tubular pivot, and a pinion fast on said shaft meshing with said rack bar.

In testimony whereof I affix my signature in presence of two witnesses.

PRIMM R. HAWTHORNE.

Witnesses:
 CHARLES E. LYMAN,
 RAY A. LESLIE.